United States Patent
Kobayashi et al.

(10) Patent No.: US 10,384,731 B2
(45) Date of Patent: *Aug. 20, 2019

(54) RECTIFYING DEVICE

(71) Applicant: SUBARU CORPORATION, Tokyo (JP)

(72) Inventors: Ryuya Kobayashi, Tokyo (JP); Yuji Fujiu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 15/724,451

(22) Filed: Oct. 4, 2017

(65) Prior Publication Data

US 2018/0093721 A1    Apr. 5, 2018

(30) Foreign Application Priority Data

Oct. 5, 2016 (JP) .................................. 2016-197259

(51) Int. Cl.
*B62D 35/02* (2006.01)
*B60G 7/00* (2006.01)

(52) U.S. Cl.
CPC ............... *B62D 35/02* (2013.01); *B60G 7/00* (2013.01); *Y02T 10/82* (2013.01); *Y02T 10/88* (2013.01)

(58) Field of Classification Search
CPC .... B62D 35/005; B62D 35/008; B62D 35/02; B60G 7/00
USPC ...................................................... 296/180.1
See application file for complete search history.

(56) References Cited

U.S. PATENT DOCUMENTS

| 4,979,597 | A | * | 12/1990 | Mehlitz | B60T 5/00 188/264 R |
| 5,511,847 | A | * | 4/1996 | Weisbarth | B60C 23/18 296/180.1 |
| 5,954,405 | A | | 9/1999 | Toman | |
| 6,315,091 | B1 | * | 11/2001 | Nilsen | F16D 65/847 188/264 A |

(Continued)

FOREIGN PATENT DOCUMENTS

| JP | S62-112972 | 7/1987 |
| JP | H09-175351 A | 7/1997 |

(Continued)

OTHER PUBLICATIONS

Reasons for Rejection dated Aug. 20, 2018 during the prosecution of Japanese Patent Application 2016-197259.

*Primary Examiner* — Gregory A Blankenship
(74) *Attorney, Agent, or Firm* — Troutman Sanders LLP (57) ABSTRACT

A rectifying device is provided in a vehicle. The vehicle includes a wheel, a housing, and a lower arm. The wheel includes a tire and a rim. The housing is provided with a hub bearing that rotatably supports the wheel. The lower arm is swingably coupled to a vehicle-body lower portion and a lower portion of the housing and extends substantially along a vehicle width direction. The rectifying device includes an air-injection member. The air-injection member is provided in front of the wheel, and configured to inject air and form an airflow that flows in an inclined manner with respect to a vehicle front-rear direction in a region at a side of the wheel near the lower arm so that a downstream side of the airflow is at an inner side in the vehicle width direction with respect to an upstream side of the airflow.

8 Claims, 5 Drawing Sheets

(56) References Cited

U.S. PATENT DOCUMENTS

| | | | | |
|---|---|---|---|---|
| 7,198,139 B2* | 4/2007 | Wilson | ............... | F16D 65/78 |
| | | | | 188/264 AA |
| 2012/0061993 A1* | 3/2012 | Hasegawa | ............ | B62D 25/16 |
| | | | | 296/181.5 |
| 2015/0021951 A1* | 1/2015 | Maurer | ............... | B60K 11/06 |
| | | | | 296/180.1 |
| 2015/0274224 A1* | 10/2015 | Ito | ............... | B62D 25/18 |
| | | | | 296/180.1 |
| 2015/0345578 A1* | 12/2015 | Nightingale | ......... | B60K 11/085 |
| | | | | 188/264 AA |
| 2017/0282980 A1* | 10/2017 | Seitz | ............... | B62D 35/005 |
| 2017/0291649 A1* | 10/2017 | Zuhlsdorf | ............ | B62D 35/02 |
| 2017/0355333 A1* | 12/2017 | Kishima | ............ | B60R 19/48 |
| 2018/0093721 A1* | 4/2018 | Kobayashi | ............ | B62D 35/02 |
| 2018/0162458 A1* | 6/2018 | McMillan | ............ | B62D 35/005 |

FOREIGN PATENT DOCUMENTS

| | | |
|---|---|---|
| JP | 2000-335437 A | 12/2000 |
| JP | 2004-338458 A | 12/2004 |

\* cited by examiner

RECTIFYING DEVICE

CROSS-REFERENCE TO RELATED APPLICATIONS

The present application claims priority from Japanese Patent Application No. 2016-197259 filed on Oct. 5, 2016, the entire contents of which are hereby incorporated by reference.

TECHNICAL FIELD

The present invention relates to rectifying devices that rectify airflows around wheels of automobiles, and more particularly relates to a rectifying device that prevents an increase in air resistance caused by an airflow passing an inner-diameter side of a rim of a wheel.

Airflows (called travel wind) are formed in an automobile such as a car. The airflows flow around a vehicle body during traveling of a vehicle.

There have been suggested various rectifying devices that rectify such airflows and improve desirable performance of vehicles.

As related art for a rectifying device provided on a vehicle, for instance, Japanese Unexamined Patent Application Publication (JP-A) No. 9-175351 describes that an air guide element is disposed at a wheel control arm of a suspension, at an attack angle with respect to an airflow in order to cool a wheel brake.

JP-A No. 2004-338458 describes that a chipping prevention cover that protrudes forward and has a rectifying effect is provided at a lateral arm of a suspension, rectifies an airflow in a vehicle-body lower portion and hence decreases the air resistance, and improves fuel efficiency and running performance.

During traveling of a vehicle, the air flows into a wheel house that houses a wheel from below a vehicle body, an engine room, etc., and hence various airflows are generated.

If such an airflow blows out from the inner-diameter side to the vehicle-body side-surface side of the rim of the wheel, the flow of the air at a vehicle-body side surface becomes turbulent, and the air resistance increases, resulting in a decrease in fuel efficiency and so forth.

SUMMARY

It is desirable to provide a rectifying device that prevents an increase in air resistance caused by an airflow passing an inner-diameter side of a rim of a wheel.

An aspect of the present invention provides a rectifying device provided in a vehicle. The vehicle includes a wheel including a tire and a rim, a housing provided with a hub bearing that rotatably supports the wheel, and a lower arm swingably coupled to a vehicle-body lower portion and a lower portion of the housing and extending substantially along a vehicle width direction. The rectifying device includes an air-injection member provided in front of the wheel, and configured to inject air and form an airflow that flows in an inclined manner with respect to a vehicle front-rear direction in a region at a side of the wheel near the lower arm so that a downstream side of the airflow is at an inner side in the vehicle width direction with respect to an upstream side of the airflow.

DETAILED DESCRIPTION

FIRST EXAMPLE

A rectifying device according to a first example of the present invention is described below.

The rectifying device according to the first example is provided at, for instance, a wheel house that is provided in an automobile such as a car and houses a front wheel.

Figure 1:
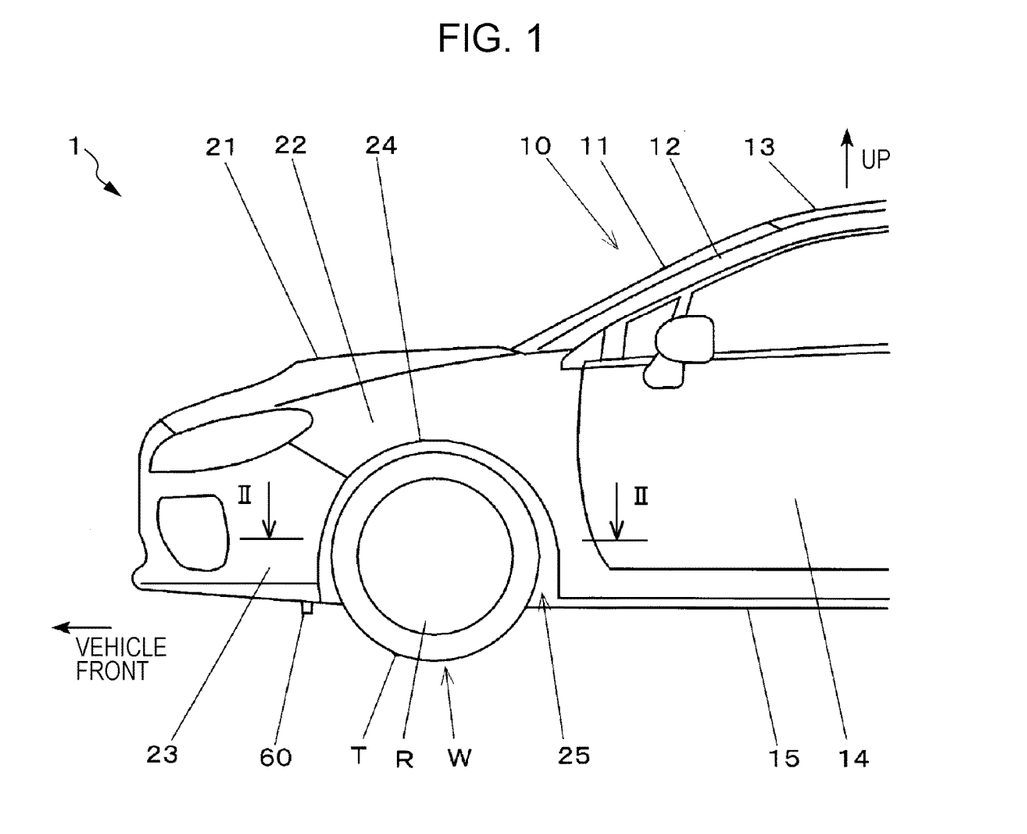
FIG. 1 is a side view of a vehicle-body front section of an automobile including a rectifying device according to a first example of the present invention.

FIG. 1 is a side view of a vehicle-body front section of an automobile including the rectifying device according to the first example.

Figure 2:
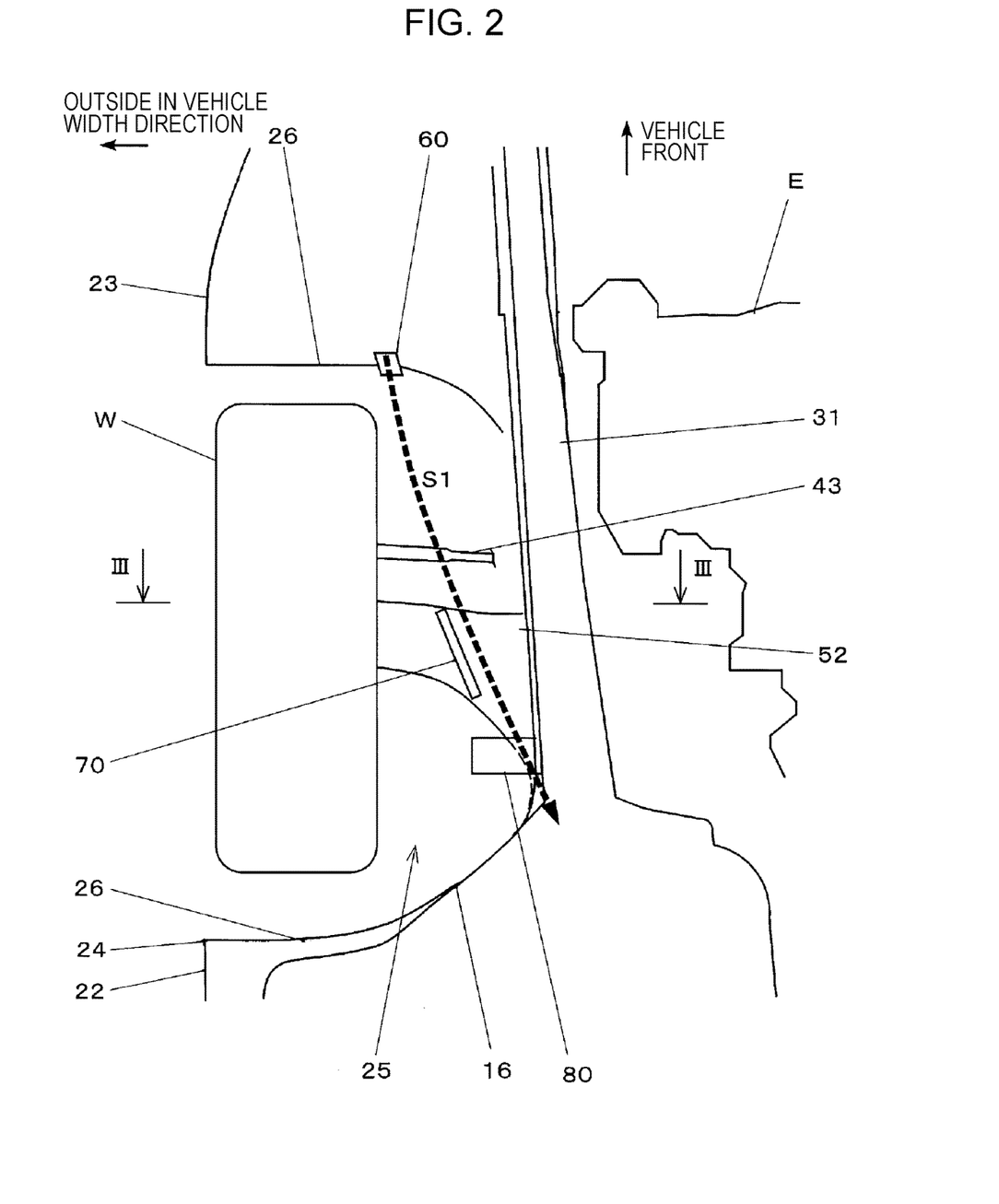
FIG. 2 is a sectional view taken along line II-II in FIG. 1.

FIG. 2 is a sectional view taken along line II-II in FIG. 1.

Figure 3:
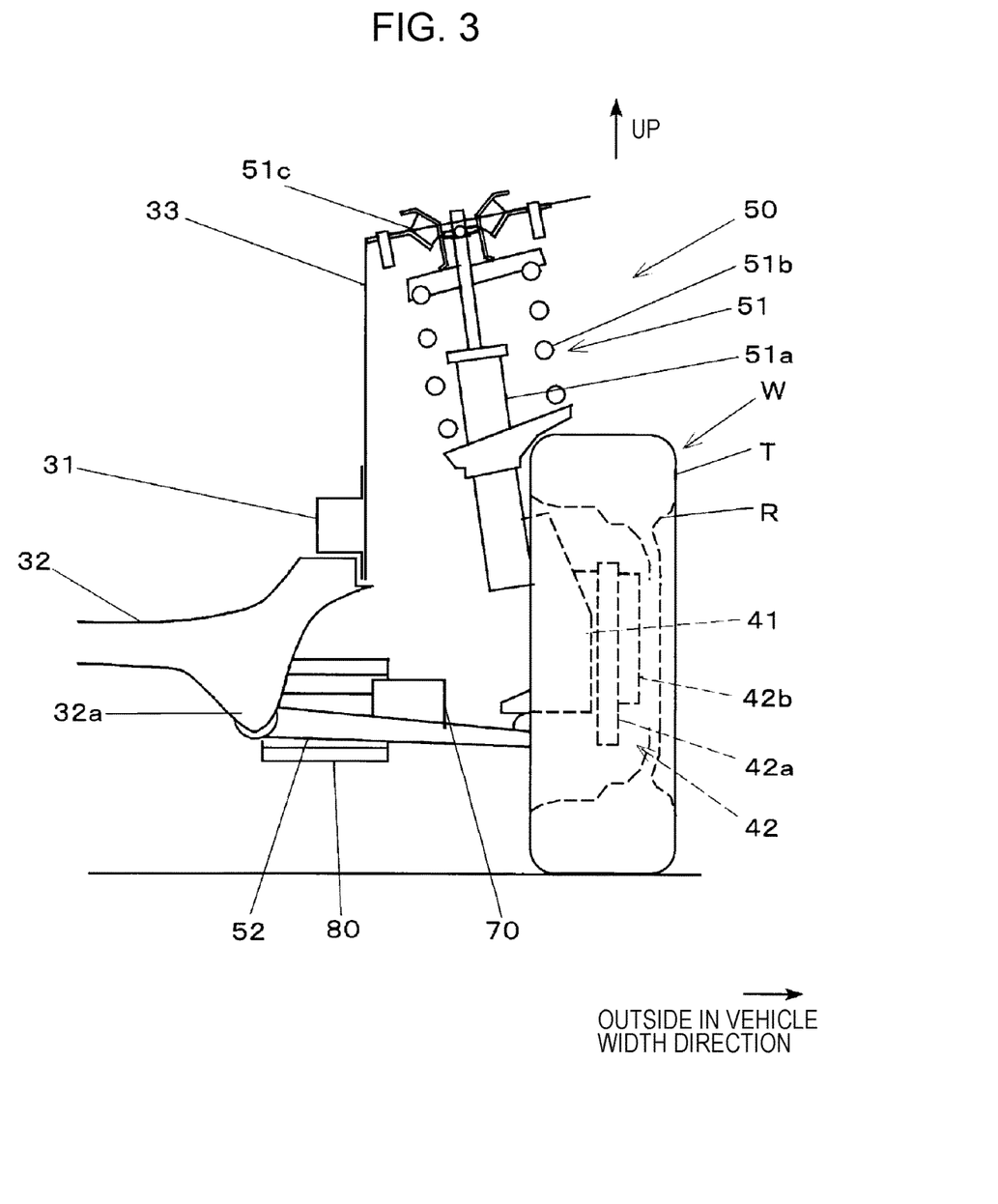
FIG. 3 is a sectional view taken along line III-III in FIG. 2.

FIG. 3 is a sectional view taken along line III-III in FIG. 2.

A vehicle 1 is a three-box or two-box car including an engine room in front of a cabin.

The vehicle 1 includes a cabin 10, a hood 21, a fender 22, a bumper face 23, a wheel arch 24, a wheel house 25, an inner fender 26, a front side frame 31, a cross member 32, a strut house 33, a housing 41, a brake 42, a tie rod 43, a suspension 50, a slit 60, a rectifying plate 70, and a louver 80.

The slit 60, the rectifying plate 70, and the louver 80 cooperatively configure the rectifying device according to the first example.

The cabin (vehicle cabin) 10 is a part that accommodates occupants etc.

The cabin 10 includes a windshield 11, an A pillar 12, a roof 13, a front side door 14, a floor 15, and a toe board 16.

The windshield 11 is provided in the upper half of a front portion of the cabin 10.

The A pillar 12 is a pillar-shaped member disposed along a side end portion of the windshield 11.

The roof 13 configures a ceiling part of the cabin 10, and extends rearward from an upper end portion of the windshield 11.

The front side door 14 is provided in the front half of a side surface of the cabin 10, and used for getting on and off of a front-seat occupant.

The floor 15 configures a bottom surface of the cabin 10, and has a plate-like shape extending substantially in the horizontal direction.

The toe board 16 (see FIG. 2) is a wall-like part standing on a front end portion of the floor 15 and extending upward.

The toe board 16 is provided in the lower half of the front portion of the cabin 10.

The toe board 16 functions as a partition wall that separates the cabin 10 from the engine room.

The hood 21 is an exterior member extending forward from a portion near a lower end portion of the windshield 11.

The hood 21 functions as a cover member that opens and closes an upper opening of the engine room provided in the vehicle-body front section.

The fender 22 is an exterior member that configures a side surface of the vehicle-body front section (around front wheel).

An upper end portion of the fender 22 is adjacent to a side end portion of the hood 21.

A rear end portion of the fender 22 is adjacent to a front end portion of the front side door 14.

The bumper face 23 is an exterior member provided at a lower portion of a vehicle-body front end portion.

A side end portion of the bumper face 23 extends to a vehicle side surface, and is disposed below a front end portion of the fender 22.

A front surface of the bumper face 23 has an opening through which travel wind is taken in for cooling a radiator core and a condenser of an air-conditioner.

The wheel arch 24 includes edge portions of the fender 22 and the bumper face 23 disposed around a wheel W.

The wheel W is a front wheel of the vehicle 1. The wheel W includes, for instance, a rim R made of metal such as an aluminum-based alloy, and a tire T mounted on an outer-diameter side of the rim R.

The wheel arch 24 has an arch-like shape substantially concentric with the wheel W in vehicle side view.

The wheel house 25 is a space that houses the wheel W, and is formed in a region at the inner side of the wheel arch 24 in the vehicle width direction.

The inner fender 26 is a cover-like member made of resin disposed in the wheel house 25, along the circumferential direction of the wheel W.

The front side frame 31 is a beam-like vehicle-body structural member protruding forward from the toe board 16 of the cabin 10.

The front side frame 31 includes a pair of left and right front side frames 31 spaced apart in the vehicle width direction. The front side frames 31 serve as a base on which an engine mount (not illustrated) that supports an engine E, the cross member 32, the suspension 50, and other members are mounted.

The engine room that houses the engine E of the vehicle 1 is provided between the left and right front side frames 31.

The cross member 32 is a structural member disposed between lower portions of the left and right front side frames 31.

The cross member 32 includes a bracket 32a.

The bracket 32a is a base to which a vehicle-body-side end portion of a lower arm 52 of the suspension 50 is coupled.

The bracket 32a protrudes downward from a portion near each of left and right side-end portions of the cross member 32.

The strut house 33 is a part that houses a strut 51 of the suspension 50.

The strut house 33 has a box-like shape being open downward.

The strut house 33 is provided at the outer side of the front side frame 31 in the vehicle width direction.

The housing 41 is a member (knuckle) that houses a hub bearing (not illustrated) that rotatably supports the wheel W.

The housing 41 is disposed at an inner-diameter side of the rim R of the wheel W.

The brake 42 includes a rotor 42a that rotates together with the wheel W, and a caliper 42b mounted at the housing 41.

The rotor 42a is a disk-like member mounted at a hub and extending in a flange-like shape from the hub to an outer-diameter side of the rotor 42a. A disk (not illustrated) of the rim R of the wheel W is fastened to the hub.

The rotor 42a is a ventilated disk that has an airflow path at a center portion in the thickness direction, an air inlet port at the center portion, and an air outlet port at an outer peripheral portion. The rotor 42a allows an airflow to pass from the air inlet port to the air outlet port during traveling.

The tie rod 43 (see FIG. 2) is a rod-like member that couples a knuckle arm (not illustrated) provided at a front end portion of the housing 41 with a steering gear box (not illustrated).

The tie rod 43 pushes and pulls the knuckle arm and hence rotates the housing 41 and the strut 51 around a predetermined kingpin axis, and steers the wheel W.

The tie rod 43 is disposed substantially along the vehicle width direction, in front and above the lower arm 52 of the suspension 50.

The suspension 50 is a suspension system that supports the housing 41 relatively displaceably within the range of a predetermined suspension stroke relative to the vehicle body.

The suspension 50 is, for instance, a MacPherson strut suspension.

As illustrated in FIG. 3, the suspension 50 includes the strut 51 and the lower arm 52.

The strut 51 is an assembly part including a shock absorber 51a that is a hydraulic damper, a coil spring 51b, and a strut upper mount 51c. The strut 51 supports an upper end portion of the housing 41.

The strut 51 is disposed so that its expansion-contraction direction is substantially along the up-down direction. The strut 51 is inclined so that an upper-end-portion side thereof is at the inner side in the vehicle width direction and the rear side with respect to a lower-end-portion side thereof.

An upper end portion of the strut 51 is mounted at an upper portion of the strut house 33 via an elastic body for vibration proof and the strut upper mount 51c having a bearing that allows the strut 51 to rotate relative to the vehicle body during steering.

An upper portion of the shock absorber 51a is inserted into an inner-diameter side of the coil spring 51b.

An upper end portion of the coil spring 51b is held by a spring seat provided at the strut upper mount 51c.

A lower end portion of the coil spring 51b is held by a spring seat extending from a shell case of the shock absorber 51a to an outer-diameter side of the coil spring 51b.

A lower end portion of the strut 51 is fixed to an upper end portion of the housing 41 by a mechanical fastener, such as a bolt and a nut.

The lower arm (transverse link) 52 is a suspension arm that is swingably coupled to a lower end portion of the vehicle body and a lower end portion of the housing 41.

The lower arm 52 has an arm portion extending substantially along the vehicle width direction.

An end portion of the lower arm 52 at the vehicle-body side is coupled to the vehicle body via an elastic-body bush provided at each of two front and rear positions.

The lower arm 52 is swingable relative to the vehicle body around a rotation axis that is substantially aligned with a line connecting the front and rear elastic-body bushes.

The front elastic-body bush is mounted at the bracket 32a of the cross member 32.

An end portion of the lower arm 52 at the housing-41 side is swingable relative to the housing 41 via a ball joint (spherical bearing) provided at the lower end portion of the housing 41.

The slit 60 injects the air in a space formed between the bumper face 23 and the inner fender 26 into the wheel house 25, in front of the wheel house 25. In one implementation, the slit 60 serves as an air-injection member.

The space stores the air introduced through, for instance, the opening formed in the front surface of the bumper face 23 during traveling of the vehicle 1. The air pressure is higher than the atmospheric pressure because of a ram pressure.

As illustrated in FIG. 2, the slit 60 is provided at a portion of the inner fender 26 that configures an inner surface of the wheel house 25, in front of the wheel W.

The position of the slit 60 in the vehicle width direction is near an end portion of the wheel W at the inner side in the vehicle width direction.

The slit 60 ejects the air while deflecting the air inward in the vehicle width direction to form an airflow S1 that flows in an inclined manner with respect to the vehicle front-rear direction so that a downstream side of the airflow S1 is at the inner side in the vehicle width direction with respect to an upstream side of the airflow S1 in plan view.

The slit 60 is preferably formed in a nozzle-like shape to increase the flow rate of the airflow S1. The slit 60 is inclined with respect to the vehicle front-rear direction so that an exit side of the slit 60 in the flow path direction is at the inner side in the vehicle width direction with respect to an entrance side of the slit 60.

Figure 4:
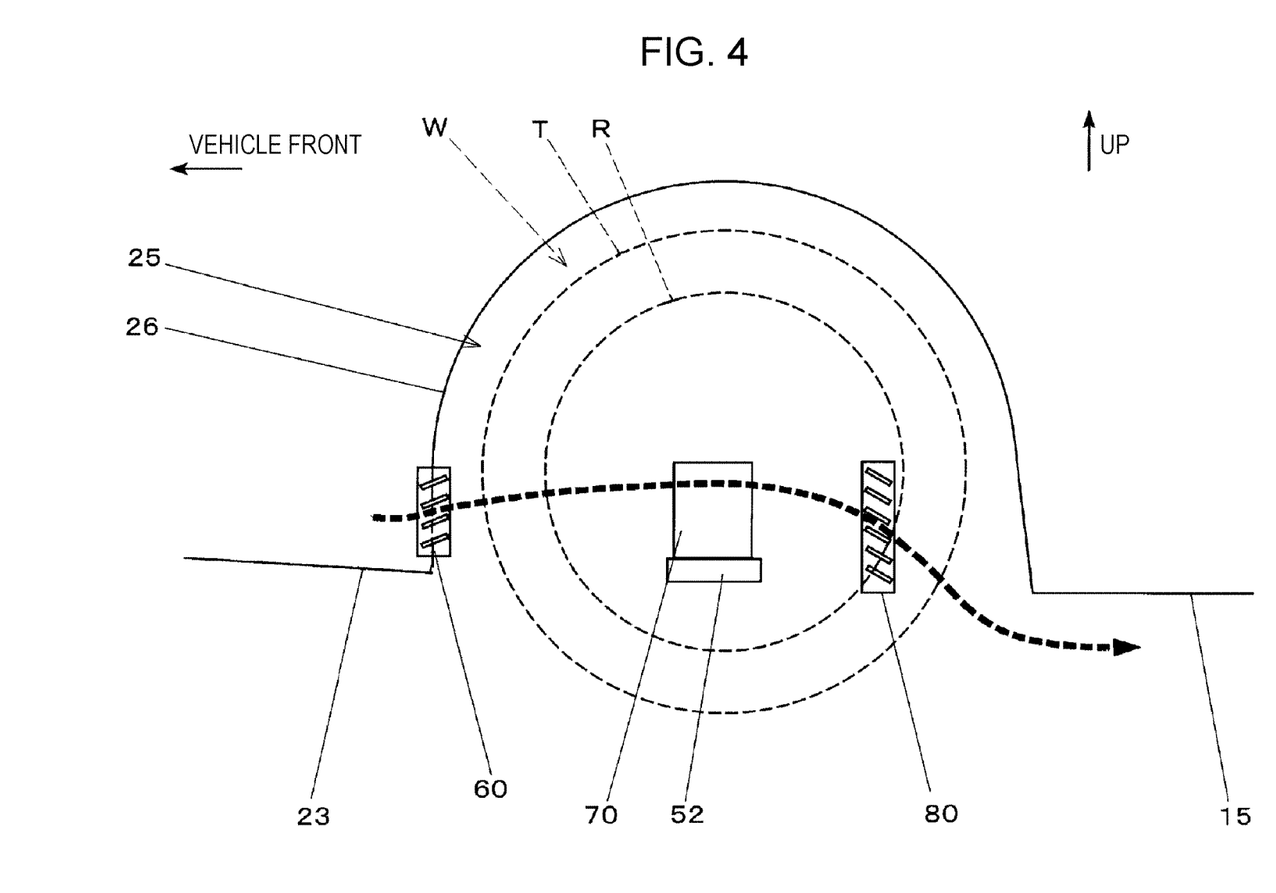
FIG. 4 is a schematic view illustrating a behavior in the up-down direction of an airflow at the rectifying device according to the first example.

FIG. 4 is a schematic view illustrating a behavior in the up-down direction of an airflow at the rectifying device according to the first example.

As illustrated in FIG. 4, the slit 60 ejects the air while deflecting the air upward so that a mainstream of the airflow S1 (portion with highest flow rate) passes above the lower arm 52.

To deflect the air in such a way, the slit 60 includes a louver having a plurality of fins arranged in the up-down direction.

Each fin is inclined so that a rear end portion thereof is higher than a front end portion thereof.

The rectifying plate 70 protrudes upward from the arm portion (region near wheel W) of the lower arm 52.

The rectifying plate 70 has a substantially rectangular plate-like shape.

As illustrated in FIG. 2, the rectifying plate 70 is inclined with respect to the vehicle front-rear direction so that a rear end portion thereof is at the inner side with respect to a front end portion thereof in the vehicle width direction.

The rectifying plate 70 has a function of deflecting the airflow S1 flowing in from the vehicle front side so that a speed component inward in the vehicle width direction of the airflow S1 increases. In one implementation, the rectifying plate 70 serves as an inward deflector.

The louver 80 deflects the airflow S1 passing above the lower arm 52 downward. In one implementation, the louver 80 serves as a downward deflector.

The louver 80 protrudes inward in the vehicle width direction from the vehicle body (for example, front side frame 31), in rear of a region where the airflow S1 passes above the lower arm 52.

The louver 80 has a plurality of fins arranged in the up-down direction.

Each fin is inclined so that a rear end portion thereof is lower than a front end portion thereof.

In the first example, the airflow S1 formed by the air injected from the slit 60 flows rearward, inward in the vehicle width direction, and upward. When the airflow S1 passes above the lower arm 52, the airflow S1 is deflected so that the speed component inward in the vehicle width direction of the airflow S1 increases by the effect of the rectifying plate 70 during passing an area near the rectifying plate 70.

The airflow S1, after passing the area near the rectifying plate 70, flows into the louver 80 and is deflected downward, is guided to the lower side (underfloor side) of the floor 15 of the cabin 10, and flows rearward of the vehicle.

With the above-described first example, the following advantages can be obtained. (1) The slit 60 forms the airflow S1 flowing rearward of the vehicle and inward in the vehicle width direction in the wheel house 25. Accordingly, a phenomenon in which the air flowing in from the vehicle-body lower portion and the engine room into the wheel house 25 blows outward in the vehicle width direction from the inner-diameter side of the rim R, interferes with the airflow flowing along the vehicle-body side surface, and increases the air resistance of the vehicle body can be prevented. (2) Since the rectifying plate 70 is provided at the lower arm 52, the airflow formed by the slit 60 is prevented from being blown rearward, the airflow inward in the vehicle width direction is held to a side portion of the wheel W, and the above-described advantages can be reliably obtained. (3) The air is injected upward from the slit 60 so that the mainstream of the airflow S1 passes above the lower arm 52, and the airflow S1 after passing the lower arm 52 is deflected downward by the louver 80. Accordingly, a phenomenon in which the mainstream of the airflow S1 strikes against the lower arm 52, makes a turbulent flow, and degrades aerodynamic performance of the vehicle can be prevented, and the above-described advantages can be further reliably obtained.

SECOND EXAMPLE

A rectifying device according to a second example of the present invention is described next.

In the second example, the same reference sign is applied to a portion substantially common to that of the first example, its description is omitted, and the different point is mainly described.

Figure 5:
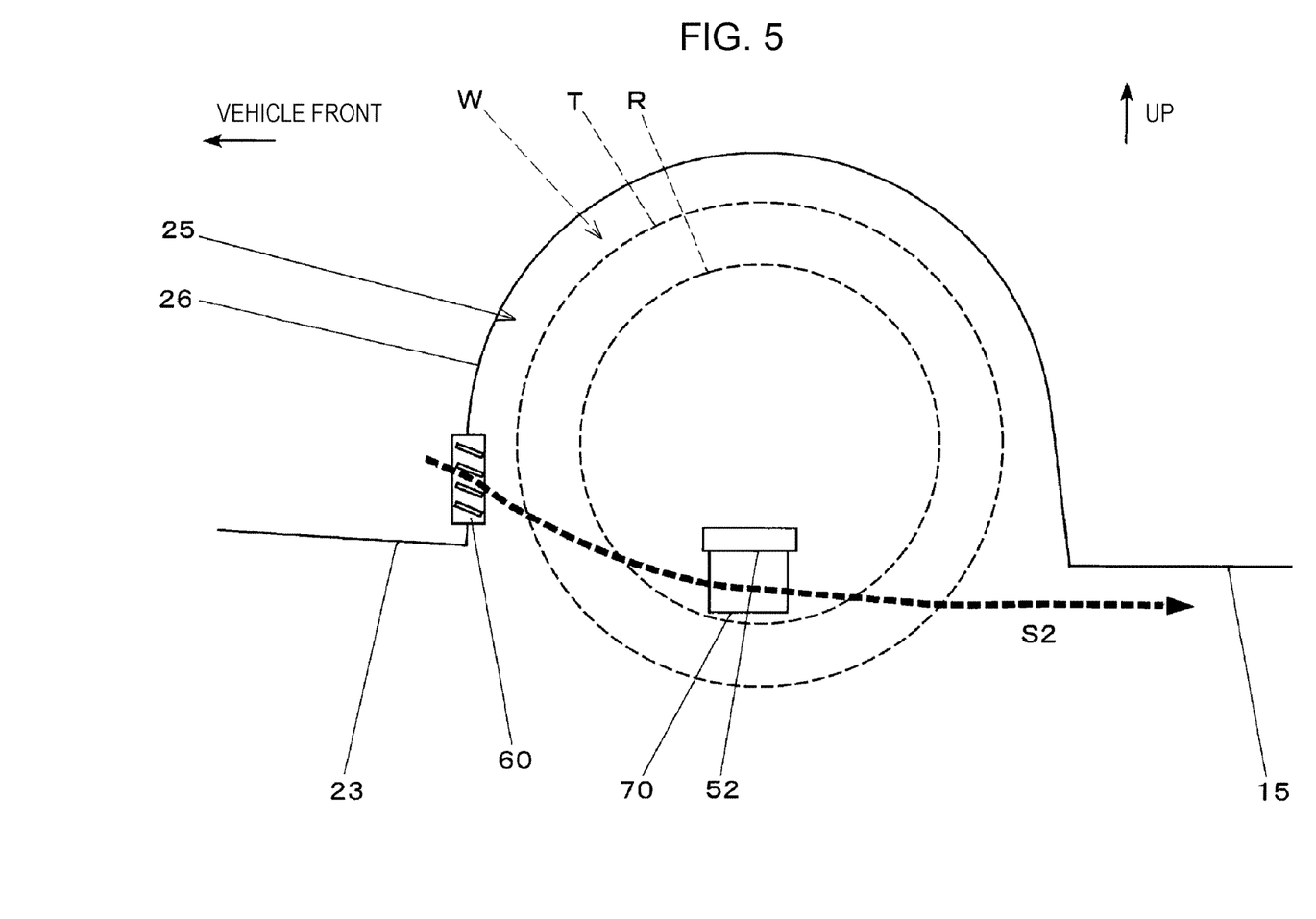
FIG. 5 is a schematic view illustrating a behavior in the up-down direction of an airflow at a rectifying device according to a second example of the invention.

FIG. 5 is a schematic view illustrating a behavior in the up-down direction of an airflow at the rectifying device according to the second example.

In the rectifying device according to the second example, the slit 60 injects the air downward so that a mainstream of an airflow S2 passes below the lower arm 52.

Also, in the second example, the rectifying plate 70 protrudes below the lower arm 52, and the louver 80 is not provided.

In the second example, the airflow S2 formed by the air injected from the slit 60 flows rearward, inward in the vehicle width direction, and downward. When the airflow S2 passes below the lower arm 52, the airflow S2 is deflected so that a speed component inward in the vehicle width direction of the airflow S2 increases by the effect of the rectifying plate 70.

After the airflow S2 passes a position near the rectifying plate 70, the airflow S2 is introduced to the lower side of the floor 15 of the cabin 10.

With the above-described second example, advantages substantially similar to those of the above-described first example can be obtained.

The present invention is not limited to the above-described respective examples, and may be modified and changed in various ways. The modified and changed examples are also within the technical scope of the present invention. (1) The shapes, structures, materials, manufacturing methods, arrangement, and number of the respective members configuring the vehicle and the rectifying device are not limited to those descried in the respective examples, and may be appropriately changed.

For instance, the configurations, arrangement, and number of the air-injection member, inward deflector, and downward deflector are not limited to those descried in the respective examples, and may be appropriately changed.

Also, while the louver 80 serving as the downward deflector is fixed to the vehicle body according to the first example, the louver 80 may be fixed to the lower arm. (2) While the rectifying device is provided at the wheel house that houses the front wheel in the respective examples, the rectifying device may be provided at a wheel house that houses a rear wheel.

The invention claimed is:

1. A rectifying device provided in a vehicle, the vehicle comprising
   a wheel comprising a tire and a rim,
   a housing provided with a hub bearing that rotatably supports the wheel, and
   a lower arm swingably coupled to a vehicle-body lower portion and a lower portion of the housing and extending substantially along a vehicle width direction,
   the rectifying device comprising:
      an air-injection member provided in front of the wheel, at the same position as a height of the rim,
      wherein the air-injection member comprises a slit provided near an end portion of the wheel at an inner side in the vehicle width direction and ejects air while deflecting air inward in the vehicle width direction from end portion of the wheel at the inner side in the vehicle width direction to form an airflow, and
      wherein the air-injection member is configured to inject air and form the airflow that flows in an inclined manner with respect to a vehicle front-rear direction in a region at a side of the wheel near the lower arm so that a downstream side of the airflow is at the inner side in the vehicle width direction with respect to an upstream side of the airflow.

2. The rectifying device according to claim 1, further comprising: an inward deflector provided at the lower arm and configured to deflect the airflow flowing in from a vehicle front side so that a speed component inward in the vehicle width direction of the airflow increases.

3. The rectifying device according to claim 1, wherein the air-injection member is configured to inject the air so that a mainstream of the airflow passes above the lower arm, and wherein the rectifying device further comprises a downward deflector configured to deflect the airflow downward in a region where the airflow passes after the airflow passes above the lower arm.

4. The rectifying device according to claim 2, wherein the air-injection member is configured to inject the air so that a mainstream of the airflow passes above the lower arm, and wherein the rectifying device further comprises a downward deflector configured to deflect the airflow downward in a region where the airflow passes after the airflow passes above the lower arm.

5. The rectifying device according to claim 1, wherein the air-injection member is configured to inject the air so that a mainstream of the airflow passes below the lower arm.

6. The rectifying device according to claim 2, wherein the air-injection member is configured to inject the air so that a mainstream of the airflow passes below the lower arm.

7. The rectifying device according to claim 3, wherein the air-injection member is configured to inject the air so that a mainstream of the airflow passes below the lower arm.

8. The rectifying device according to claim 4, wherein the air-injection member is configured to inject the air so that a mainstream of the airflow passes below the lower arm.

\* \* \* \* \*